Patented Dec. 26, 1922.

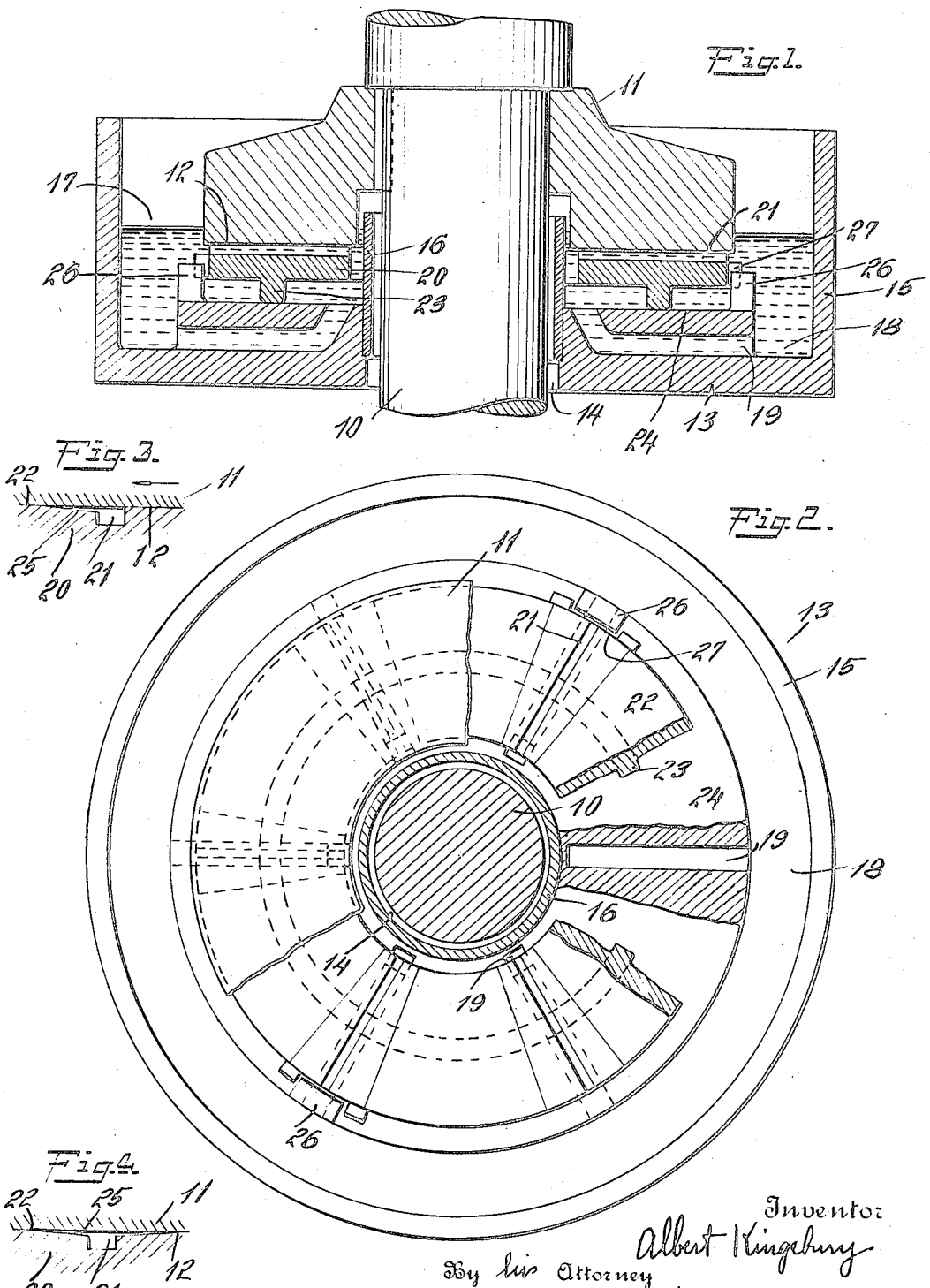

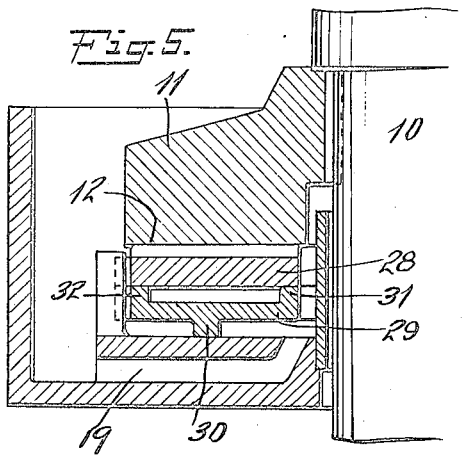
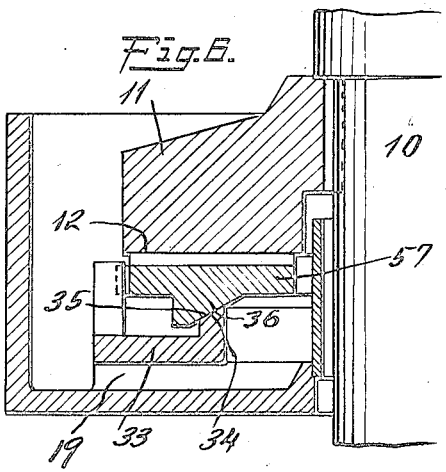
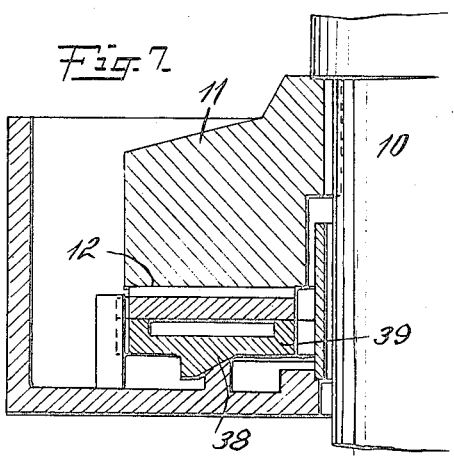
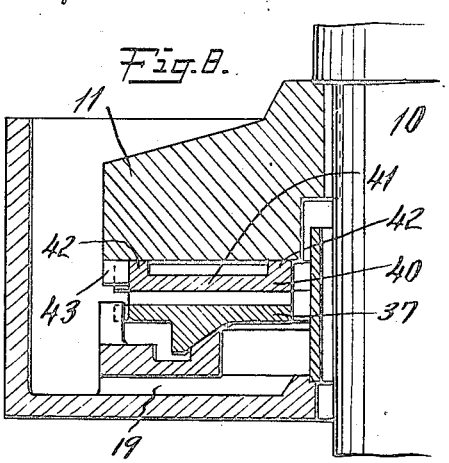
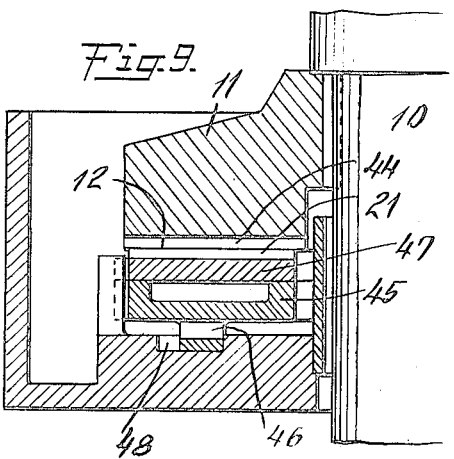
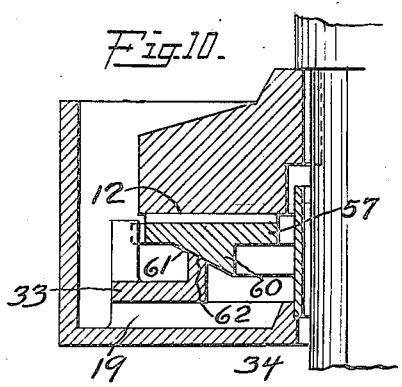

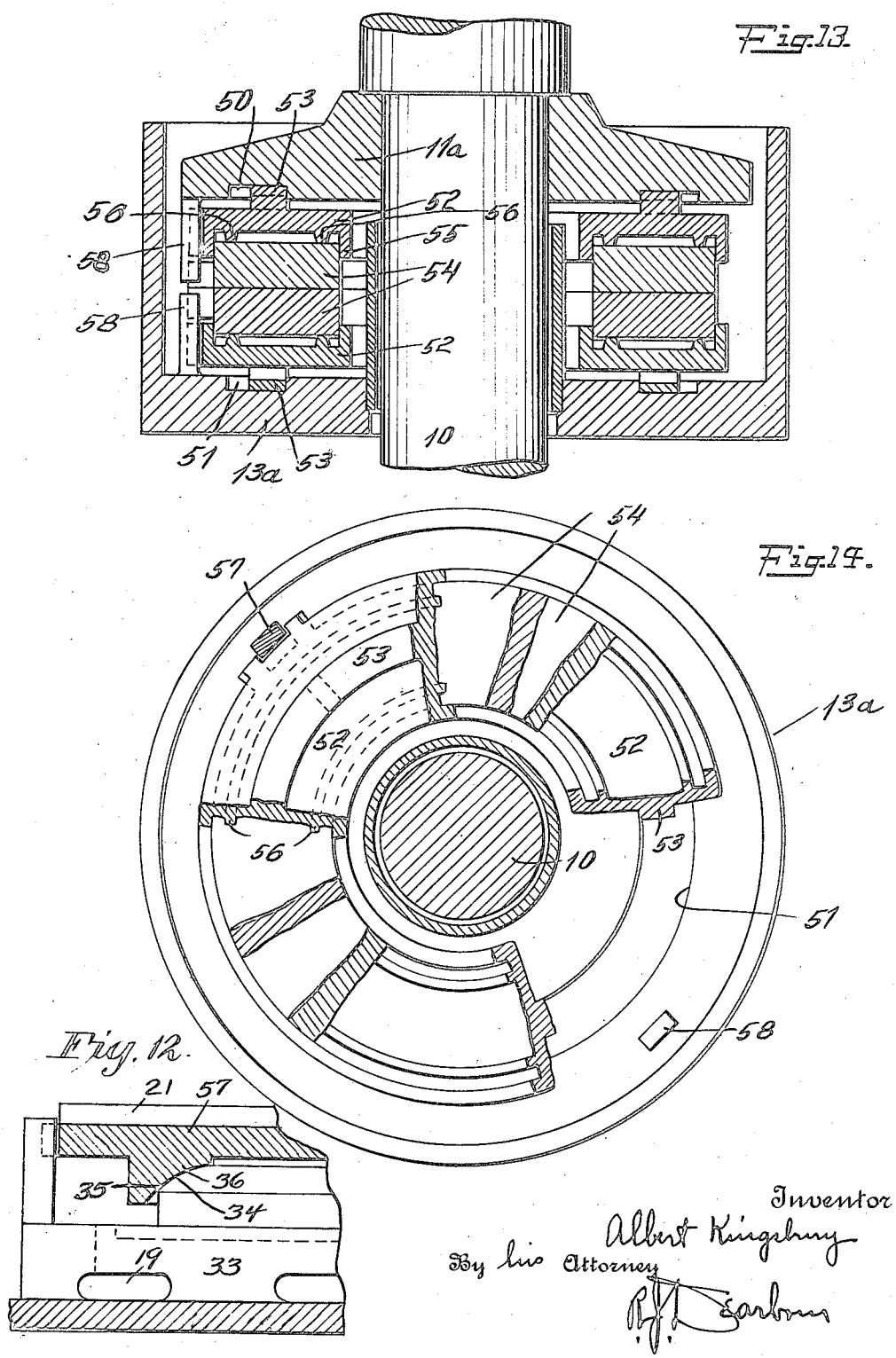

1,440,299

UNITED STATES PATENT OFFICE.

ALBERT KINGSBURY, OF GREENWICH, CONNECTICUT.

BEARING.

Application filed April 10, 1917, Serial No. 160,941. Renewed October 23, 1922. Serial No. 596,463.

*To all whom it may concern:*

Be it known that I, ALBERT KINGSBURY, a citizen of the United States, and a resident of Greenwich, county of Fairfield, and State of Connecticut, have invented certain new and useful Improvements in Bearings, of which the following is a specification, reference being had to the accompanying drawings, forming a part thereof.

My invention relates to bearings, and has special reference to thrust bearings which are adapted to sustain heavy loads and comprise segmental or annular surface-bearing members.

One object of my invention is to provide means for uniformly distributing the bearing pressure upon the bearing surfaces of relatively-thin, collar-like bearing members, particularly with a view to avoiding a large increase of pressure near the shaft and a decrease of pressure near the outer edge of the bearing surfaces, a consequence likely to result with ordinary collar bearings because of the expansion of the thrust collar due to the normal heating of the bearing in operation.

Another object of my invention is to support one or both of the annular bearing members of a thrust bearing employing one or more relatively-thin, collar-like bearing members so as to permit a slight dishing of the members to insure an equitable distribution of pressure upon the bearing surfaces.

Yet another object of my invention is to provide a bearing having substantially continuous bearing members one or both of which are so mounted as to equalize the pressure on concentric zones of the bearing surfaces, with means whereby the lubricating oil is automatically wedged between said bearing surfaces to create and maintain an oil film therebetween.

Still another object of my invention is to provide a relatively thin annular bearing member having a bearing surface and provided with annularly arranged supporting means to permit the same to flex or tilt radially in response to pressure variations.

Other objects relate to the provision of an annular bearing member of improved construction and provided with improved means for mounting the same.

In order that my invention may be thoroughly understood I will now proceed to describe the same in the following specification, and then point out the novel features thereof in appended claims. The invention is capable of receiving a variety of mechanical expressions some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a sectional elevation of a thrust bearing arranged and constructed in accordance with my invention.

Figure 2 is a plan view of the same bearing with the parts broken away to more clearly illustrate the construction.

Figures 3 and 4 are sectional detail views drawn to a larger scale showing in an exaggerated way the preferred formation of at least one of the thrust bearing members.

Figures 5 to 10 inclusive are partial sections corresponding to Figure 1, showing structures which embody my invention.

Figure 11 is a sectional detail of the arrangement shown in Figure 9.

Figure 12 is a partial section showing the Figure 6 construction on a larger scale.

Figures 13 and 14 correspond to Figures 1 and 2 and show a further embodiment of my invention.

In the form shown in Figures 1 to 4 inclusive 10 designates a shaft which is provided with a thrust collar 11 having an annular bearing surface 12. The relatively stationary member of the bearing comprises a base 13 having a central opening 14 through which the shaft 10 extends and an outer flange or wall 15. A sleeve 16 is attached to the base, loosely surrounds the shaft 10, and in conjunction with the outer flange or wall 15 provides an annular oil pocket 17 in which the bearing surfaces are disposed.

The base 13 has a circumferential groove or slot 18 and a plurality of radial passages 19 to provide for the circulation of oil as hereinafter explained.

Mounted on the base 13 is a relatively thin flexible annular bearing member 20 preferably provided with radial grooves 21 in its bearing surface 22. The surface 22 is preferably beveled slightly adjacent to the grooves, either at one edge of the groove as shown at 25 in Figure 3, or at both edges as shown at 25 in Figure 4. The arrangement of Figure 3 is best adapted for use when the rotating thrust collar 11 moves in the direction of the arrow in Figure 3. The arrangement of Figure 4 enables the bearing to operate in either direction with equal facility.

The annular bearing member 20 in this embodiment has a downwardly extending annular projection or bead 23 which rests upon a surface 24 of the base 13 and forms a mounting for the ring. It is preferably located substantially at the mean radius of the ring.

The base is preferably provided with one or more lugs 26 which engage notches 27 in the bearing ring 20 for the purpose of preventing the rotation of the ring with the thrust collar 11.

When the bearing is in operation, the shaft 10 and the thrust collar 11 being in rotation, oil which freely enters the grooves 21 is squeezed into the wedge-shaped openings 25, provided by the beveled faces of the ring, and thereby an oil film is automatically created and maintained between the bearing surfaces.

By reason of the normal heating of the bearing in operation the surface 12 instead of remaining a plane surface becomes deformed into a frusto-conical surface of low altitude which tends to increase the pressure and the wear between the bearing surfaces near the shaft. The bearing ring 20, however, is adapted to insure a substantially equal distribution of pressure over the bearing surfaces in spite of the deformation of the surface 12 because of the fact that it is mounted on the bead or annular projection 23 which allows the ring 20 to be dished slightly, by radial flexure producing a bearing surface which is slightly frusto-conical to correspond and cooperate with the bearing surface 12.

The oil is centrifugally carried toward the outer portion of the bearing surfaces and the passages 19 are provided for the purpose of allowing the oil to flow inwardly therethrough into the space near the collar 16 from which it enters the bearing surfaces.

Instead of providing a bead or annular projection such as 23 on the bearing ring itself, a relatively thin bearing ring 28, as shown in Figure 5, may be employed and mounted on a flexible supporting ring 29 having a bead or projection 30 corresponding to the projection 23. This support may also have upwardly extending annular projections 31 and 32 on which rest the respective edges of the bearing ring. This structure acts in the same way as that of Figures 1 and 2, but in addition prevents the bearing surface of the ring from becoming crowned.

Figure 6 corresponds to Figure 1 except that a base 33 is provided having a convex spherically curved supporting surface 34 which cooperates with a concave spherically curved surface 35 on a downwardly extending projection 36 of the bearing ring 57. The projection 36 takes the place of the projection 23 and acts in the same way except that it is self-adjusting by reason of its spherical support and accommodates the surface of the bearing ring 57 to the surface 12 of the thrust collar even though the shaft 10 may be slightly out of alignment.

The spherical or ball and socket mounting for the bearing ring is shown on a larger scale in Figure 12.

Figure 7 corresponds to Figure 5 except that a projection 28, provided instead of the projection 30, is formed with a spherical surface to correspond with the projection 36 of Figure 6.

Instead of mounting the bearing ring on a member such as the member 29 of Figure 5 or the member 39 of Figure 7, a bearing ring 37 such as that shown in Figure 6 or Fig. 1 may cooperate with a flexible ring-shaped member 40 as shown in Figure 8, said member having a bearing surface 41 and annular projections 42 near its edges. This member 40 is adapted to rotate with the collar 11 which has lugs 43 cooperating loosely with slots in the member 40.

Of course it will be understood that in each of the embodiments, oil grooves 44 may be provided in the bearing surface 12 of the collar as shown in Figs. 9 and 11, either instead of the grooves 21 in the bearing ring or in addition to these grooves. Furthermore, a supporting ring 45 may take the place of the ring 29 of Figure 5 and be provided with radial slots or openings 46 through its downwardly extending projection 47 for the purpose of permitting the oil circulation without the necessity of providing slots or grooves 19 in the base.

The projection 47 may extend into an annular groove such as 48 in Figure 9 but the groove should be made wider than the projection in order to permit the expansion of the ring due to the normal heating when the bearing is in operation.

The structure of Figure 10 is like Figure 6, except that instead of the projection 36 the ring 57 has a projection 60 provided with a convex spherically curved surface 61 which cooperates with a correspondingly curved supporting surface 62.

In the form shown in Figs. 13 and 14 the thrust collar 11$^a$ is provided with an annular groove 50 and the base 13$^a$ is provided with an annular groove 51. A pair of similar supporting rings 52, having annular projections 53 which extend into the grooves 50 and 51 respectively, are arranged to support a pair of bearing rings 54. The ring-shaped supports 52 have flanges 55 forming channels to receive the rings 54 and are provided with annular projections 56 on which the rings are supported near their edges. The collar 11ª is preferably provided with one or more lugs 57 and the base is preferably provided with one or more lugs 58 for the purpose of causing the rings 54 and their supports to act as a part of the rotating and stationary members of the bearing respectively.

The cooperating bearing surfaces of the rings 54 may be plane or curved in any suitable manner and the supports act as the supports 29 and 45 to which reference has already been made and prevent crowning due to the heating of the bearing members or for other cause.

Attention is directed to the fact that the supporting projection in Figures 6, 7 and 8 has a concave spherical curvature and the resultant pressure due to the reaction of the curved surface of the cooperating support acts upon the ring so as to decrease the pressure between those portions of the bearing surfaces close to the shaft.

This is clearly an advantage since it acts in opposition to the tendency produced by the normal heating of the bearing in operation, as already explained.

The projection 60 shown in Fig. 10, which has a convex spherical surface, is preferably offset outwardly so that it is nearer the outer edge of the bearing ring than the inner edge. This is for the reason that the resultant pressure—which is due to the reaction of the spherically curved supporting surface—acts upon the ring in such manner as to increase the pressure between those portions of the bearing surfaces which are close to the shaft. This tendency is objectionable but may be counteracted to a greater or less degree, together with a like tendency which is due to the normal heating of the bearing surfaces, by offsetting the projection outwardly as above indicated and as shown in Figure 10. This species of my invention is covered in my copending application Serial No. 195,239 which is a division of this application.

In all of the embodiments of my invention one or both of the bearing members, being relatively thin and flexible and mounted on relatively narrow annularly arranged supporting means, may tilt or twist radially to maintain substantially uniform pressure engagement between the bearing surfaces irrespective of the crowning or distortion of either or both of the bearing members from the heating effects of normal operation or from other cause. When one or both of the bearing members are mounted on relatively narrow annularly arranged supporting means with the interposition of radially-spaced annularly arranged supporting means for the bearing member adjacent the edges of the same, the above action is facilitated while any tendency of such bearing member to crown, except under exterior force, is diminished or eliminated. When the relatively narrow annular support is additionally formed as a member of a ball and socket support the corresponding bearing member may adjust itself as a whole to maintain uniform pressure engagement between the bearing surfaces. Furthermore, the provision of oil grooves in one or both of the bearing members, with one or both of the edges of the bearing segments formed thereby tapered to said grooves, insures the wedging of the oil between the bearing surfaces and the maintenance of proper lubricating films therebetween.

It will therefore be perceived that a relatively thin annular bearing member has been provided which is flexible throughout its extent and which is so mounted as to permit its automatic radial distortion in response to pressure variations to maintain uniform bearing engagement between the bearing surfaces.

While the embodiments of the invention illustrated on the drawings have been described with considerable particularity, it is to be expressly understood that the invention is not limited thereto as changes may be made in form and arrangement and the invention embodied in a variety of mechanical expressions without departing from the spirit of the invention. Reference is therefore to be had to the claims hereto appended for a definition of the limits of the invention.

What I claim is:

1. A bearing comprising a bearing member having an annular bearing surface which is subject to distortion by heating under normal operating conditions, and a continuously flexible bearing member having a bearing surface and so supported as to be automatically distorted to coact with the first-named member and to thereby equitably distribute the pressure over the cooperating bearing surfaces.

2. A bearing comprising an annular bearing member and a relatively thin annular member having a bearing surface cooperating therewith and so arranged and supported as to be capable of assuming the form of a frustro-conical body of low altitude.

3. A thrust bearing comprising a support, a relatively thin annular bearing member having a bearing surface adapted to coact with the annular surface of an opposed bearing member, and a relatively thin annulus interposed between the bearing member and the support and so mounted on the support as to permit rocking or distortion of said annulus.

4. A continuously-flexible annular bearing member having a bearing surface adapted to coact with the surface of an opposed annular bearing member and a substantially concentric annular projection constituting a support on which the bearing member may rock or twist radially.

5. A bearing comprising an annular bearing member provided with a bearing surface having radially extending oil grooves and slightly beveled portions adjacent thereto, and a substantially concentric annular projection constituting a support substantially at the mean radius thereof.

6. A bearing comprising a relatively thin ring-shaped member having a bearing surface adapted to coact with the surface of an opposed annular bearing member and means for supporting said member substantially at its mean radius.

7. A bearing comprising an annular member having an annular projection, and a base having a spherically curved surface on which the annular projection is seated.

8. A bearing comprising an annular member having a substantially central spherically faced annular projection, and a base having a spherically curved surface on which the annular projection is seated.

9. A thrust bearing comprising a support with a spherically curved surface, an annular bearing member, and a relatively thin annulus interposed between the bearing member and the support and having a substantially central annular projection resting on the spherically curved support.

10. A thrust bearing comprising an annular member having a bearing surface subdivided into shoes by transverse oil grooves, at least one edge of each shoe being beveled slightly from the adjacent groove to provide for the formation of an oil wedge, and means for supporting the annular member to permit it to be tilted or flexed radially.

11. An annular bearing member having a bearing surface subdivided by transverse grooves, and a substantially concentric annular projection constituting a support, each of the subdivisions of the bearing surface being slightly beveled from at least one of the adjacent transverse grooves.

12. A bearing comprising a ring-shaped member having a plurality of transverse oil grooves providing bearing shoes or sectors, and means for supporting the member to permit radial tilting or flexing thereof, said shoes being constructed to permit the wedging of the oil between the bearing surfaces from the grooves.

13. A thrust bearing comprising a support, an annular bearing member having a bearing surface adapted to coact with the surface of an opposed annular bearing member, and a relatively thin annulus interposed between the first-named bearing member and the support having annular projections engaging the bearing member near its edges and a centrally located annular projection extending into contact with the support.

14. A bearing composed of relatively rotatable surface-bearing members one of which is composed of a relatively thin unitary flexible ring adapted to be distorted radially to permit said ring to cooperate with the other member under varying conditions.

15. A bearing composed of relatively rotatable annular surface-bearing members of which one is composed of a relatively thin unitary flexible ring, and means for supporting the same to permit radial distortion.

16. A bearing composed of relatively rotatable annular surface-bearing members of which one is composed of a relatively thin unitary flexible ring, and an annular support intermediate the edges of said ring to permit radial distortion thereof.

17. A bearing composed of relatively rotatable annular surface-bearing members of which one is composed of a relatively thin unitary flexible ring, and an annular projection substantially midway between the edges of the flexible ring for supporting the same to permit radial distortion thereof.

18. A bearing composed of relatively rotatable annular-surface bearing members, of which one comprises a unitary flexible ring having a narrow annular projection cooperating with a supporting member to form a ball and socket support intermediate the edges of the flexible ring and permit the automatic adjustment of the ring either by bodily movement as a whole or by radial twisting or distortion of its parts.

19. A bearing composed of relatively rotatable annular surface-bearing members, of which one comprises a continuously-flexible bearing ring and a unitary flexible ring having a relatively narrow axially extending annular projection intermediate its edges for supporting the same and permitting radial distortion thereof.

20. A bearing composed of relatively rotatable annular surface-bearing members of which one comprises a continuously-flexible bearing ring and a unitary flexible ring having a relatively narrow axially extending annular projection substantially midway between its edges.

21. A bearing composed of relatively rotatable bearing members of which one comprises a unitary flexible ring having a narrow axially extending annular projection with a spherically curved surface thereon, and a correspondingly curved supporting member for the said ring, whereby the latter is adapted to be automatically adjusted to conform to the bearing member with which it cooperates.

22. In a thrust bearing the combination of a thrust collar, and a relatively flexible annular bearing member having superficially separated bearing segments, with means, independent of any tilting of the said segments, for wedging oil between the bearing surfaces, and other means for supporting the flexible member in such manner as to permit of the radial distortion and tilting of the surface segments thereof.

23. A thrust bearing comprising a relatively rigid bearing collar and a relatively flexible annular bearing member superficially divided into segments, the said flexible member having means, independent of any tilting of the segments, for wedging oil between the bearing surfaces and having a relatively narrow annular support adapted to permit radial tilting of the segments.

24. A thrust bearing comprising a relatively rigid thrust collar and a relatively flexible annular bearing member provided with radially disposed grooves having beveled portions at their transverse edges for wedging oil between the bearing surfaces, and means for supporting the flexible member in such manner as to permit of the elastic distortion and the radial tilting of the surface segments thereof.

25. A bearing comprising a relatively flexible annular bearing member superficially divided into segments having beveled portions at their transverse edges, and provided with a relatively narrow annular support to permit radial tilting of the segments thereof.

26. A bearing comprising a relatively thin flexible annular member having a bearing surface adapted to coact with the surface of an opposed annular bearing member, and means for supporting the same in such manner as to permit of its automatic change of form under varying pressure conditions.

27. A bearing comprising a continuously flexible annular surface-bearing member, and means for annularly supporting the same to automatically compensate for varying pressure conditions on the bearing surface.

28. A bearing comprising a flexible annular surface-bearing member and annular supporting projections cooperating with the edges thereof.

29. A bearing comprising relatively rotatable surface-bearing members, one of which comprises a relatively thin bearing ring, and means for supporting said bearing ring whereby it may conform with the surface of the opposed bearing member and have substantially uniform bearing engagement therewith.

30. A bearing comprising an annularly arranged surface-bearing member and a flexible annular support therefor having annular projections near its edges on one side and an annular projection intermediate its edges on the opposite side.

31. A bearing comprising an annularly arranged surface-bearing member, and a flexible annular supporting member having annular projections extending into engagement with the annular bearing member near its edges and another annular projection substantially midway between the edges and on the opposite side of the said supporting member.

32. A bearing comprising a thrust bearing member having an annular surface which is subject to crowning or distortion by the heating of the bearing when in operation, a cooperating bearing member comprising a relatively-thin flexible annulus, and means for supporting the same so as to permit the bearing surface thereof to conform to, and cooperate with, the entire bearing area of the opposing thrust member, and thereby eliminate the localized heating and wear of the engaging surfaces.

33. A bearing composed of relatively rotatable surface-bearing members of which one is composed of a relatively-thin flexible ring having relatively-narrow annularly-arranged supporting means intermediate its edges.

34. A bearing comprising a continuously flexible annular surface-bearing member having an annular supporting projection on its opposite side from its bearing surface.

35. A bearing comprising an annular member flexible throughout its extent and having a bearing surface adapted to coact with the surface of an opposed annular bearing member, and means for supporting said member to permit the same to tilt radially.

36. A bearing comprising a relatively rigid member having an annular bearing surface, a cooperating bearing member consisting of a relatively-thin flexible ring in bearing contact with said annular bearing member, and means for supporting said flexible ring to permit the same to flex in response to pressure variations.

37. A bearing comprising a relatively rigid member having an annular bearing surface, a cooperating bearing member consisting of a relatively-thin flexible ring in bearing contact with said annular bearing member, and means for supporting said flexible ring to permit the same to flex in response to pressure variations, at least one of the bearing surfaces having apertures through which oil is delivered to the bearing surfaces.

38. A thrust bearing comprising relatively rotating annular bearing members in contact with one another and receiving the end thrust of the shaft one from the other, one of said bearing members being thin and flexible, and an annular projection constituting pivotal supporting means for said latter bearing member and permitting the local tilting thereof in radial planes.

39. A bearing comprising a continuously-flexible bearing member having its bearing surface divided into a plurality of bearing segments by transverse oil grooves, and a relatively narrow annular projection on which said member is mounted to tilt radially.

40. A bearing comprising a bearing member having its bearing surface divided into a plurality of bearing segments by transverse oil grooves, each of said segments having its bearing surface tapered adjacent a groove, and relatively-narrow annularly-arranged supporting means for said bearing member.

41. A bearing comprising a flexible bearing member having a spherically-faced relatively-narrow annular projection, and means having a spherical surface with which said projection engages.

42. A bearing comprising a flexible annular supporting member having annularly-arranged projections near its edges on one side and a spherically-faced annular projection intermediate its edges on the opposite side.

43. A bearing comprising an annularly arranged surface-bearing member, a flexible annular supporting member having annular supporting means in engagement with said bearing member near its edges, an annularly arranged supporting means on the opposite side of said flexible member.

44. A bearing comprising a relatively-thin flexible bearing member provided with a plurality of transverse oil grooves, the bearing surface of said ring being slightly tapered adjacent each of said grooves.

45. A thrust bearing comprising a flexible surface-bearing member having an annular support provided with a spherically-curved supporting surface.

46. A bearing comprising relatively rotatable bearing members one of which includes a thin flexible bearing ring superficially divided into segments constructed to automatically form oil films between the bearing surfaces of said members, and means for supporting said flexible ring to permit radial tilting of said segments.

47. A thrust bearing comprising relatively movable members having opposed bearing surfaces, one of said members comprising a plurality of flexibly-united segments, each of said segments being so constructed as to automatically wedge the lubricating fluid between said bearing surfaces when the bearing is in operation, and longitudinally-extending rib-supporting means for said bearing segments.

In witness whereof I have hereunto set my hand this 28th day of March, 1917.

ALBERT KINGSBURY.